H. DOWNING.
SELF FEEDER FOR GRAIN SEPARATORS.
APPLICATION FILED NOV. 5, 1919.
1,371,021.
Patented Mar. 8, 1921.
2 SHEETS—SHEET 2.
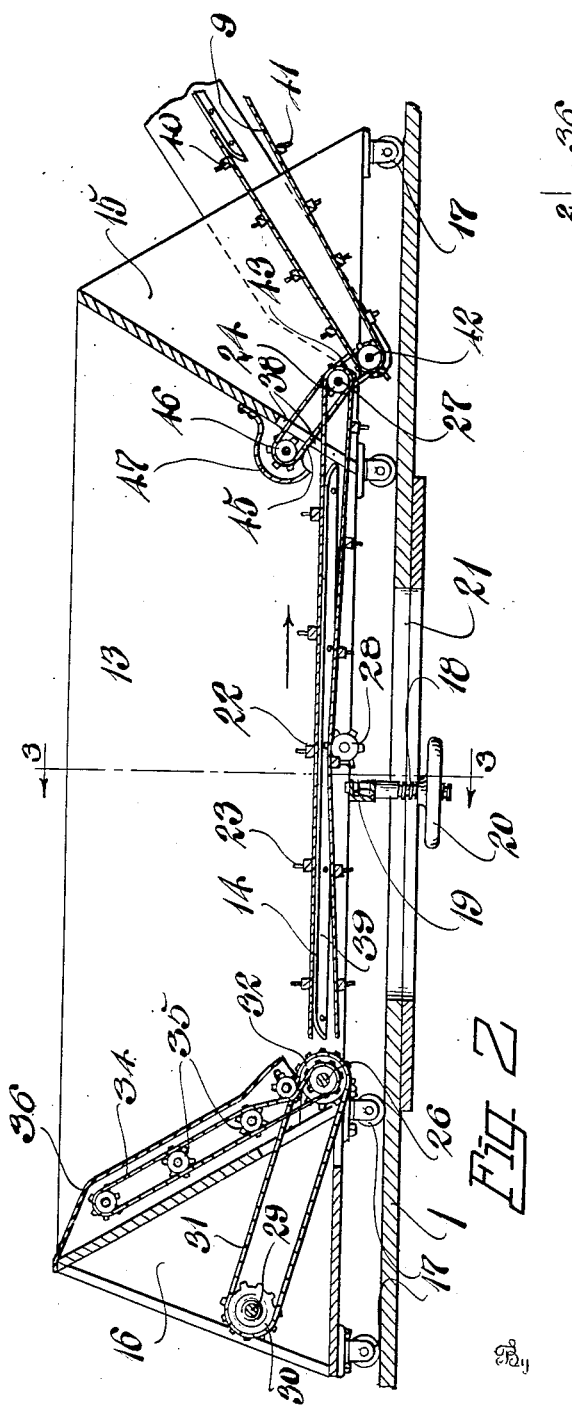
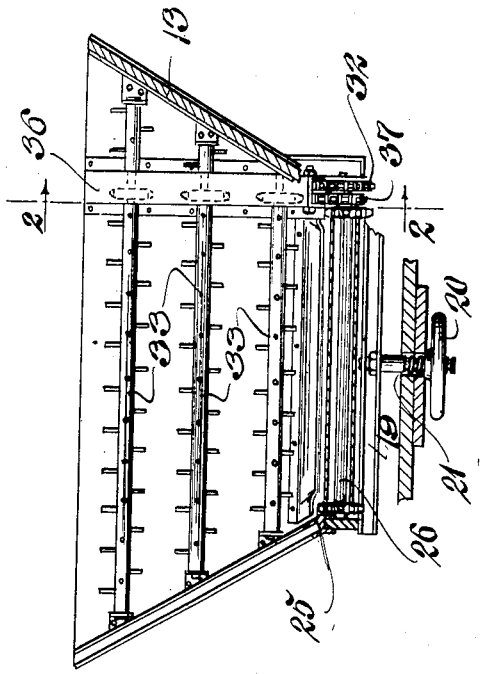
Inventor
Hiram Downing
Attorney

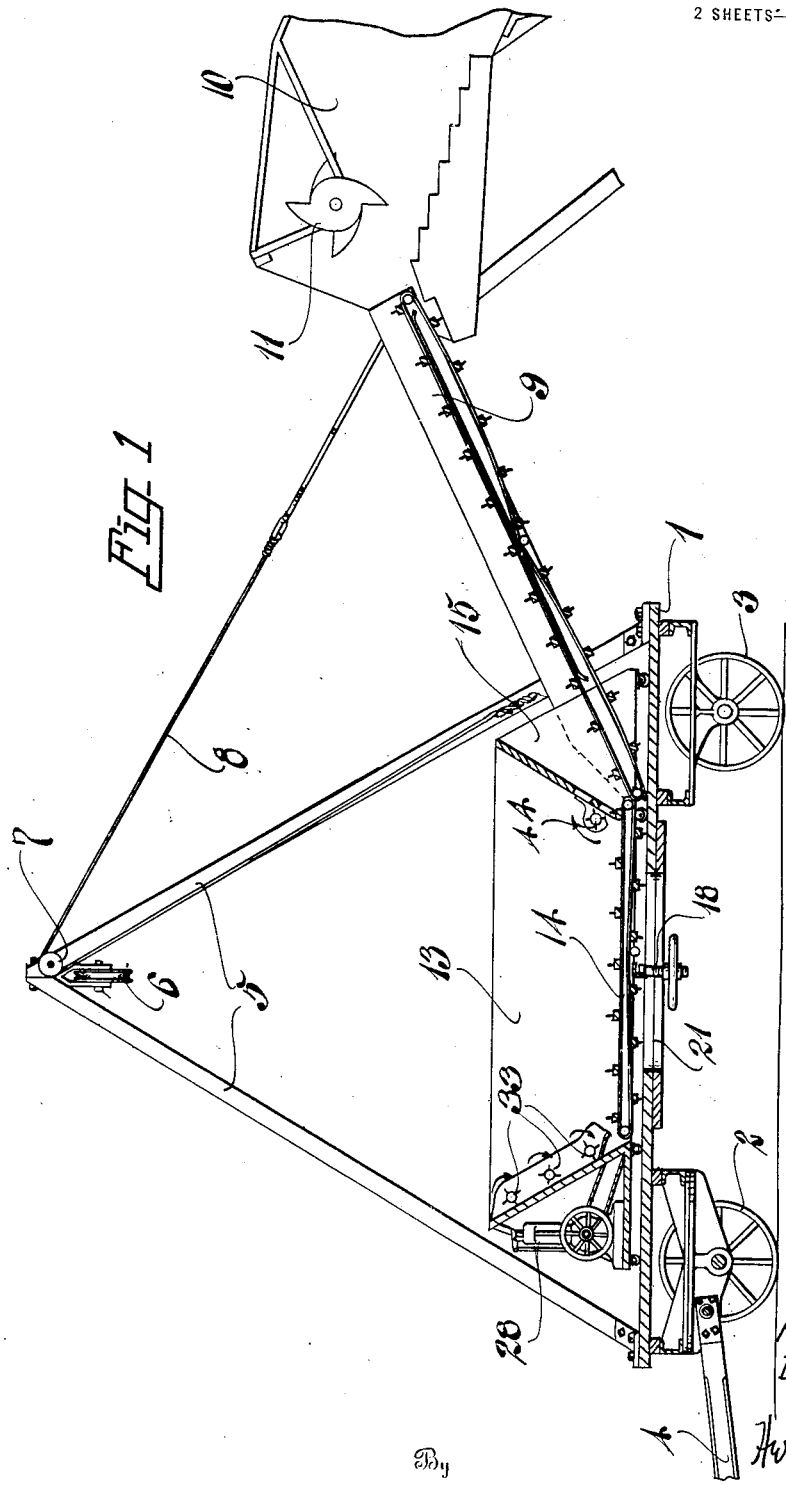

UNITED STATES PATENT OFFICE.

HIRAM DOWNING, OF SPOKANE, WASHINGTON.

SELF-FEEDER FOR GRAIN-SEPARATORS.

1,371,021.   Specification of Letters Patent.   Patented Mar. 8, 1921.

Application filed November 5, 1919. Serial No. 335,820.

*To all whom it may concern:*

Be it known that I, HIRAM DOWNING, a citizen of the United States, residing at Spokane, in the county of Spokane and State of Washington, have invented certain new and useful Improvements in Self-Feeders for Grain-Separators, of which the following is a specification.

The present invention relates to an improved self feeder for the grain separators of threshing machines, and is designed as a portable, automatic feeding mechanism for supplying the grain and straw to the separator of the threshing machine.

The primary object of the invention is the provision of a portable, adjustable mechanism, including a hopper into which the grain is placed, and from which it is continuously fed and its progress regulated as it is passed to the grain separator. In feeding straw to the separator, the customary proceeding is to haul the straw to the "hoe down machine" or flat top table mounted on a truck adjacent the separator, or the straw stacks are pulled over to the table, and the "hoe down" men with peculiar shaped forks, pull the straw to the elevator which then feeds the straw to the separator. To obviate the loss of time in transferring the material, and to reduce the manual labor required, I have designed the present self-feeding mechanism forming the subject matter of this invention, and to this end the invention consists in certain novel combinations and arrangements of parts, as illustrated in the drawings, and as will be hereinafter more particularly pointed out and claimed, whereby the straw may be received at the threshing machine or separator, and then automatically and without the instrumentality of manual labor, be fed to the separator.

In the accompanying drawings I have illustrated one complete example of the physical embodiment of my invention, the parts being combined and arranged according to the best mode I have so far devised for the practical application of the principles of my invention.

Figure 1 is a longitudinal, vertical, sectional view of the apparatus, complete, embodying my invention.

Fig. 2 is an enlarged, vertical, longitudinal sectional view of the hopper and feeding mechanism detached from its supporting truck and platform, and taken at line 2—2 of Fig. 3.

Fig. 3 is a transverse sectional view of the hopper and conveyer or feeder, at line 3—3 of Fig. 2.

In the preferred form of the invention as depicted in the drawings I utilize a portable apparatus including the platform truck 1, supported upon the front and rear pairs of wheels 2 and 3, and the draft tongue 4 of usual form is utilized for the attachment of horses or other power for transporting the machinery from place to place. The platform or table is rectangular in shape and properly supported on the wheels 2 3, and upon the top of the platform the legs 5 are located, supporting the sheave 6, and the pulley 7 for the line 8, which latter is employed to adjust the inclination of the elevator 9 my means of which the grain is fed directly to the feeders 10 of the separator, the usual band cutting knives 11 and other accessories of the separator being employed, but not shown, as they form no part of the present invention.

Upon the platform 1 the hopper 13 is supported, which, as shown has inclined side walls, and preferably is rectangular in shape, extending longitudinally of the platform and open at top and bottom, except for the conveyer 14 traveling across its open bottom upon which the straw is placed and from thence fed to the separator. The hopper has extensions 15 and 16 at its ends, to the under side of which are attached the casters 17 that rest upon the platform and may roll thereon as the hopper is adjusted toward or away from the separator and moved relatively to the platform of the truck. In order that the hopper and the supported feed mechanism may be retained in adjusted position with relation to the platform, a clamp screw 18 is journaled in the transverse angle iron brace 19 extending across the underside of the hopper and attached at its sides, and this screw has a hand wheel 20 by means of which the parts may be operated. In the platform an elongated opening or longitudinal slot 21 is provided for the screw so that the hopper may be moved longitudinally of the platform, and then when the wheel is turned the screw clamps the hopper to the slotted platform as shown in detail in Fig. 2 of the drawings.

The conveyer 14 in the bottom of the hopper travels with its upper flight in the direction of the arrow and comprises the usual endless, flexible belt or apron, the cross slats 22 and pins or spikes 23 in the slats, the endless apron passing around the sprocket wheels 24 which engage the chains 25 at the edges of the conveyer and the whole supported on the operating shaft 26 and countershaft 27, idlers 28 being provided beneath the lower flight and supported in the sides of the hopper.

Power for operating the different mechanisms is provided from the gas motor or engine 28, supported on the extension 16 at the rear end of the feeding apparatus, whose driving shaft 29 is connected by sprocket 30, chain 31 and sprocket 32, to the operating shaft 26 directly driving the conveyer bottom 14 of the hopper. To assist in placing the straw and guiding it onto the conveyer 14 I utilize a number of revolving pickers 33 at the rear of the hopper adjacent the rear wall, which are made up of spiked bars suitably journaled transversely of the hopper and driven by the sprocket chain 34 passing over the respective sprocket wheels 35 of the pickers, a shield or housing 36 being provided to protect the wheels and chain from the grain, and the chain 34 is operated by the sprocket 37 on the operating shaft 26 as seen in Fig. 2. These pickers revolve in the direction of the arrows in Fig. 1 and operate to move the straw at the rear end of the hopper onto the horizontal conveyer or movable bottom of the hopper, which conveys the straw, through the opening 38 in the front wall of the hopper, to the elevator 9, a guide plate or plates 39 being fixed at the sides of the hopper near the bottom to support the upper flight of the conveyer, as in Fig. 2.

The elevator 9 includes the usual apron and has cross slats 40 with spikes or pins 41 for conveying the straw as it is received through the opening 38 from the horizontal conveyer 14, and the elevator is pivotally supported at its lower end on the shaft 42, journaled in bearings beneath the extension 15 of the hopper and extending transversely of the hopper. The endless elevator 9 is driven from the counter-shaft 27 by sprocket chain 43 and sprocket wheels on the respective shafts, and moves in the same direction as the horizontal conveyer 14, to feed the straw to the separator as indicated in Fig. 1.

To regulate the passage of the straw through the opening 38 from the horizontal conveyer to the elevator, and prevent congestion or clogging at this point I utilize a picker 44 similar to the pickers 33 at the rear of the hopper, this picker being revolved in a clockwise direction the picker teeth will engage with the straw on the lower half of their movement and at a time when the teeth are traveling counterwise to the direction of flow of the straw. This will retard movement of the straw and prevent any excess from passing through the opening 38. This picker is driven from the countershaft 27 by sprocket chain 45 and sprocket wheels 46, a shield or housing 47 (Fig. 2) being provided for the working parts. The picker 44 extends entirely across the hopper at the opening or port 38, but the housing or shield 47 is only of sufficient width to cover the wheels and chain, and the picker is located above the conveyer in position to permit a stream of straw say three or three and a half inches thick to pass through the opening, the picker revolving in clockwise direction to retard or prevent excess material passing through the opening 38. In this manner an even and constant feed is uniformly provided, and a maximum continuous capacity is furnished for a days run of the machine.

It is thus apparent that the entire feeding machinery is bodily supported on the hopper and its extensions, and the hopper, with its extensions is adjustably supported on the platform of the truck or wagon, and all operating parts of the feeder are constantly in alinement regardless of the position of the feeder with relation to the platform 1. The adjustability of the hopper with relation to the platform enables a careful and accurate alinement of the hopper, conveyer, and elevator with the feeders of the separator so that the straw may be properly fed to the separator although the truck or wagon may not be longitudinally alined with the separator, and as each setting or arrangement of the feeder with the separator requires individual adjustment, it will readily be seen that the utilization of the apparatus saves time and labor, and insures efficient and accurate work.

What I claim is—

1. The combination with the slotted platform of an open bottom hopper having an endless conveyer therein, and an elevator co-acting with the conveyer, a clamp screw on the hopper extending through the slotted platform, and means for clamping the hopper and platform in adjusted position.

2. The combination with the supporting platform, of an adjustable hopper thereon and means for locking said parts in adjusted position, a conveyer, and operating means therefor, in the hopper, and an elevator co-acting with said conveyer as described.

3. The combination with the slotted platform and its supporting trucks, of a hopper open at top and bottom and provided with clamping means co-acting with said slotted platform, an endless conveyer in the open bottom of the hopper, a pivoted adjustable, inclined elevator at the end of the conveyer to receive material therefrom, said hopper having an opening for the conveyer and a revolving picker for regulating the passage of material through the opening to the elevator, a series of revolving pickers at the rear wall of the hopper, a motor supported on the hopper, and connections from the motor for actuating said devices.

In testimony whereof I affix my signature.

HIRAM DOWNING.